United States Patent [19]

Costello et al.

[11] Patent Number: 5,120,451
[45] Date of Patent: Jun. 9, 1992

[54] PROCESS FOR REDUCING THE CYANIDE CONTENT OF A SOLUTION

[75] Inventors: Michael C. Costello, Greenwood; Douglas G. Rogers, Willetton; Philip J. Guerney, Fig Tree Pocket, all of Australia

[73] Assignee: Minproc Technology Pty. Limited, East Melbourne, Australia

[21] Appl. No.: 671,911

[22] PCT Filed: Jul. 5, 1990

[86] PCT No.: PCT/AU90/00289

§ 371 Date: Mar. 19, 1991

§ 102(e) Date: Mar. 19, 1991

[87] PCT Pub. No.: WO91/00248

PCT Pub. Date: Jan. 10, 1991

[30] Foreign Application Priority Data

Jul. 5, 1989 [AU] Australia .............. PJ5097

[51] Int. Cl.$^5$ .............. C02F 1/20; C02F 1/58
[52] U.S. Cl. .............. 210/750; 210/754; 210/756; 210/903; 210/904
[58] Field of Search .............. 210/750, 754, 756, 743, 210/903, 904

[56] References Cited

U.S. PATENT DOCUMENTS

| | | | |
|---|---|---|---|
| 2,766,100 | 10/1956 | Sayles | 210/904 |
| 3,592,586 | 7/1971 | Scott | 210/904 |
| 4,029,557 | 6/1977 | Christensen et al. | 204/149 |
| 4,056,469 | 11/1977 | Eichenhofer et al. | 210/756 |
| 4,070,281 | 1/1978 | Tagashira et al. | 210/904 |
| 4,105,545 | 8/1978 | Muller et al. | 210/15 |
| 4,366,064 | 12/1982 | Mihelic et al. | 210/754 |
| 4,437,996 | 3/1984 | Okugawa | 210/904 |
| 4,752,400 | 6/1988 | Pearson | 210/750 |

FOREIGN PATENT DOCUMENTS

| | | |
|---|---|---|
| 51967 | 5/1982 | European Pat. Off. . |
| 55-49191 | 4/1980 | Japan . |
| 59-32993 | 2/1984 | Japan . |
| 650983 | 3/1979 | U.S.S.R. . |
| 895741 | 5/1962 | United Kingdom . |
| 1418743 | 12/1975 | United Kingdom . |

*Primary Examiner*—Thomas Wyse
*Attorney, Agent, or Firm*—Merchant, Gould, Smith, Edell, Welter & Schmidt

[57] ABSTRACT

A process for treatment of waste aqueous process streams from industrial process containing both cyanide ions and dissolved ammonia to reduce the cyanide content, comprising the consecutive steps: (a) adding a halogenating agent to the solution while maintaining the pH of the solution at greater then 7; (b) removing ammonia from the solution by aeration; (c) acidifying the solution to a pH of less then 7; (d) substantially neutralizing the solution; and (e) removing the ammonia from the solution by aeration.

8 Claims, No Drawings

PROCESS FOR REDUCING THE CYANIDE CONTENT OF A SOLUTION

BACKGROUND OF THE INVENTION

1. Field of the Invention

The present invention relates to a process for reducing the cyanide content of a solution.

The use of an alkaline aqueous solution of a cyanide salt for recovery of gold and/or silver values from ores, tailings and wastes has been well known and documented for along period. While this process is well known and widely used for such precious metal recovery it is also to be understood that the waste water streams from such processes contain cyanide in solution which could be dangerous if allowed to enter the environment and particularly the water supply.

For this reason, waste aqueous process streams from gold treatment plants using alkaline cyanide solutions as the leachant must meet specific composition limits before they are discharged into the environment. In particular, the total cyanide and free cyanide concentrations must be below the maximum limits set by local, state and federal licensing authorities.

Similar requirements are imposed on the effluent discharged from cyanide production plants and from other industrial processes some of which produce waste water streams containing other species notably ammonia as well as cyanide ions.

2. Discussion of the Prior Art

A number of processes have been proposed to bring about the chemical breakdown of the total and free cyanide components of typical effluent streams. Some of the processes have been patented and several are presently used on the commercial scale.

High temperature hydrolysis brings about the total destruction of the cyanide ion, but the high temperatures and extended retention times required makes this process inefficient in cost terms. Some chemical reagents convert the cyanide ion only to cyanate. In many localities, discharge of cyanide is not permitted. Further destruction of cyanate may be inefficient or costly in reagent consumption terms, or in fact require a different chemical reagent.

The complexity of cyanide destruction is compounded by the presence of other species in solution that interfere with the destruction mechanism and/or substantially increase the capital and operating costs. One such species is dissolved ammonia.

Treatment of an effluent or processing liquor containing, for example, an equivalent concentration of cyanide ions and dissolved ammonia, by the standard cyanide destruction methods is unsatisfactory in terms of additional reagent consumption, increased capital and operating costs and/or incomplete cyanide destruction. These methods include the use of hydrogen peroxide, chlorine, chlorine/calcium hydroxide, hypochlorite, or sulphur dioxide.

The applicants are aware, for example, of a proposal described in Australian patent application No. 73261/81 (PCT International Publication Number WO82/00288) for removing cyanide ions from solutions. This process provides for adjusting the solution of a pH to at least about 11 and to a halide content at least equivalent to the cyanide concentration. Electrolysis is performed using intense agitation of the electrolyte to result in deposition of solid carbon on the anode. Electrolytic methods generally require a readily available source of cheap electricity for economic operation and this is not always available in remote areas. Further, this proposal does not deal with any dissolved ammonia also present in the waste water stream.

Australian patent application No. 17053/88 (PCT International Publication Number WO 88/04408) relates to a method for separating by aeration a component such as cyanide from a liquid containing the component. The method comprises passing the liquid through an array of aeration columns arranged in stages so that the liquid flowing from one column in a first stage is divided into two or more streams which are introduced into separate aeration columns in a successive second stage. However this process is likewise unsuitable for use in remote areas and does not effectively deal with any dissolved ammonia present in the waste water system.

Australian patent application No. 76929/81 relates to the chlorination of waste water containing ammonia, cyanide and phenol. This method involves adding a chlorinating compound to the waste water in a first vessel at pH 8.5 to 10, passing the waste water to a second vessel at pH 6 to 8 and controlling the addition of the chlorinating compound in response to the redox potential in the second vessel so as to maintain the redox potential at +625 millivolts to +750 millivolts. This method requires close monitoring of redox potentials and is specifically directed at waste water containing phenol as well as ammonia and cyanide contaminants.

SUMMARY OF THE INVENTION

It is accordingly an object of the present invention to provide in one embodiment an improved process for reducing the cyanide content of a solution containing both cyanide and dissolved ammonia.

We have now found that the cyanide concentration of an effluent or process stream containing both cyanide and dissolved ammonia can be lowered to a level acceptable for discharge by a combination of steps. Accordingly, the present invention provides in one embodiment a process for reducing the cyanide content of a solution containing both cyanide ions and dissolved ammonia, comprising the following consecutive steps:

(a) adding a halogenating agent to the solution while maintaining the pH of the solution at greater than 7;

(b) removing ammonia from the solution by aeration;

(c) acidifying the solution to a pH of less than 7;

(d) substantially neutralizing the solution; and (e) removing the ammonia from the solution by aeration.

We have found that his combination of steps is effective in terms of both capital and operating costs and suitable for use in remote locations.

In step (a) the pH may be between 11 and 12 and most preferably about 12. The preferred reagent for raising the pH in step (a) and/or step (d) is sodium hydroxide.

In step (c) the preferred pH is less than 5 and most preferably from 3 to 4.

In step (d) the pH of the substantially neutralized solution may be about 7 and most preferably in the range 6 to 7.

The ammonia may be removed from the solution by aeration in the form of air stripping. Removed or stripped ammonia is preferably collected in a suitable gas scrubbing system.

The halogenation agent is preferably a chlorination agent. The chlorination agent may be any agent capable of generating and/or liberating chlorine in aqueous solution. Chlorine gas and agents capable of generating and/or liberating chlorine gas in the solution are particularly preferred for use as halogenation agents in accordance with the present invention. Hypochlorites such as sodium hypochlorite have been found suitable for use as chlorination agents in accordance with the present invention.

Where the chlorination agent is added in the form of gaseous chlorine the addition to the liquor may be achieved by means of a suitable gas sparging or bubbling system to oxidize the cyanide to cyanate.

In the process provided by the present invention, cyanide is converted by oxidation in step (a) to cyanate, which in step (c) is hydrolyzed to ammonia and carbon dioxide. The carbon dioxide is readily removed from the reaction system. Step (c) may be considered as an acidification and hydrolysis step for converting the cyanate ion from the substantially ammonia free solution produced in step (b) to produce ammonia and carbon dioxide.

Steps (d) and (e) have the effect of re-neutralizing the liquor derived from step (c) followed by removing the dissolved ammonia produced by the acid hydrolysis of the cyanate ion. The final tail solution should be low in ammonia and contain little if any cyanide.

Each step ma be carried out at temperatures close to ambient temperature (typically 15° C.-30° C.) and does not require the use of exotic materials of construction, nor the use of complex chemical engineering principles.

The present invention uses the effective combination of various known processes, none of which on its own, or in any other combination, would achieve the results achieved by the present invention by carrying out the present process, sequentially involving steps (a), (b), (c), (d) and (e). The process thus provides a unique method having substantial and unexpected advantages for treatment of waste waters.

More importantly, because the oxidation of cyanide to cyanate and the removal of dissolved ammonia are carried out separately, reagent consumption is minimized. This particularly applies to step (a), where tests show that complete oxidation of cyanide to cyanate is achieved by addition of typically 1.05 times the stoichiometric requirement of the halogenation agent.

Another significant advantage of the present process is that decomposition of cyanate to ammonia and carbon dioxide does not require the use of costly reagents.

EXAMPLES

The present invention is further described in the following non-limiting examples of illustrative embodiments.

EXAMPLE 1

Initial laboratory scale testing of individual steps in the process of the invention were carried out to demonstrate under controlled conditions the operation of individual steps.

A. Examples of the Oxidation Step

As the source of chlorine, the laboratory testwork used as a chlorinating agent a solution of sodium hypochlorite with an equivalent free chlorine content of 13.1 g/L as determined by titration against standard thiosulphate solution.

A solution (200 mL) containing 1000 ppm of cyanide ion (as sodium cyanide) and 1000 ppm of ammonia was treated with the above solution of sodium hypochlorite and the cyanide concentration was measured by ion selective electrode as a function of the added equivalent chlorine. In Test 1, shown in Table 1, the weight of chlorine sufficient to oxidize the amount of cyanide present in the solution to cyanate ion, was 0.54 g. The pH was 11.9-12.2 during the test.

TABLE 1

Test 1: Oxidation of Cyanide (1000 ppm) to Cyanate with Chlorine in the presence of Ammonia (1000 ppm)

| Chlorine Added (gms) | Cyanide Concentration (gms) |
| --- | --- |
| 0.26 | 311 |
| 0.39 | 136 |
| 0.50 | 37 |
| 0.52 | 17 |
| 0.55 | 6 |
| 0.59 | 0 |

Test 2 was carried out in the same way as Test 1 except that the initial solution was 100 mL in volume and contained 2000 ppm of cyanide ion and 2000 ppm of ammonia.

TABLE 2

Test 2: Oxidation of Cyanide (2000 ppm) to Cyanate with Chlorine in the presence of Ammonia (2000 ppm)

| Chlorine Added (gms) | Cyanide Concentration (gms) |
| --- | --- |
| 0.26 | 547 |
| 0.39 | 241 |
| 0.50 | 64 |
| 0.52 | 29 |
| 0.55 | 6 |
| 0.59 | 2 |

B. Examples of the Hydrolysis Step

As a pure source of cyanate ion, a solution of 3.1 g/L potassium cyanate was used.

In Test 3, 200 mL of this cyanate solution was treated with sufficient sulphuric acid solution to maintain pH 3.0 at room temperature. The increase in ammonia concentration as hydrolysis of cyanate proceeded was measured by specific ion electrode. The results are shown in Table 3.

TABLE 3

Test 3: Hydrolysis of Cyanate ion to Ammonia at pH 3.0

| Time (min) | Ammonia Concentration (ppm) | Conversion to to Ammonia (%) |
| --- | --- | --- |
| 1 | 152 | 15 |
| 5 | 340 | 34 |
| 20 | 689 | 69 |
| 60 | 1,034 | 103 |

Test 4 was carried out in the same way as Test 3 except that the pH was maintained at pH 3.5.

TABLE 4

Test 4: Hydrolysis of Cyanate ion to Ammonia at pH 3.5

| Time (min) | Ammonia Concentration (ppm) | Conversion to to Ammonia (%) |
| --- | --- | --- |
| 1 | 124 | 15 |
| 5 | 195 | 20 |
| 20 | 483 | 48 |
| 60 | 759 | 76 |

TABLE 4-continued

| Test 4: Hydrolysis of Cyanate ion to Ammonia at pH 3.5 | | |
|---|---|---|
| Time (min) | Ammonia Concentration (ppm) | Conversion to to Ammonia (%) |
| 105 | 1,027 | 103 |

EXAMPLE 2

A test run was carried out on a prepared aqueous solution containing 2,000 mgm $NH_3$ per liter and 1200 mgm $CN^-$ per liter to simulate a waste process stream from an industrial process containing both cyanide ions and dissolved ammonia.

(a) Chlorination:

The solution was subjected to chlorination to oxidize all $CN^-$ to $CNO^-$ using the minimum $Cl_2/OCL^-$ possible.

It was believed that a sharp rise in redox would occur at the 100% stoichiometric $Cl_2$ addition point i.e. where $CN^-$ concentration <1 ppm.

The pH during the chlorination was held at 11.9–12.0.

Chlorination was conducted by the addition of sodium hypochlorite. The results are summarized in Table 1 which shows that the stoichiometry at the mV rise was 100%–105%.

TABLE 1

| TIME (mins) | HYPO ADDED (% Stoich) | REDOX (mV) | pH | $CN^-$ (ppm) |
|---|---|---|---|---|
| 0 | 0 | +116 | 11.4 | 1,210 |
| 2 | 11 | | | |
| 10 | 22 | +10 | 11.9 | |
| 21 | 33 | | | |
| 24 | | | | 716 |
| 29 | 44 | | | |
| 37 | | −46 | 11.9 | |
| 38 | 56 | | | |
| 47 | | | | 384 |
| 53 | 67 | | | |
| 78 | | −92 | 11.9 | |
| 79 | 78 | | | |
| 95 | | | | 105 |
| 100 | 89 | | | |
| 129 | | −78 | 11.9 | 18 |
| 134 | 100 | | | |
| 148 | | −15 | 11.9 | |
| 157 | | | | 4 |
| 161 | 103 | | | |
| 174 | | +5 | 12.0 | |
| 176 | 105 | | | |
| 189 | | | | 0.3 |
| 191 | | +8 | 12.0 | |
| 192 | 108 | | | |
| 206 | | +20 | 12.0 | |

(b) First Aeration

The $CNO^-/NH_3$ mixture formed at around pH 12 in the chlorination step was passed through a packed column to remove the bulk of the $NH_3$ to atmosphere leaving a weak $NH_3/CNO^-$ solution.

The column used for all aerations was a 7 m length of 300 mm Class 6 PVC pipe packed with 5 m of 1" tellerettes. Air flow was produced by fan suction with flow measured at the fan outlet using a digital turbine anenometer. Liquor flow was visually monitored via flow meter but physically measured by level change in the head tank.

Liquor flow was produced by a centrifugal pump running at −2800 rpm.

Ammonia removal was 89% at an Air Liquor ratio of 4900:1. The area specific flow rates were:

Liquor = 0.55 1 $m^{-2}sec^{-1}$

Air = 162 $m^3min^{-1}m^{-2}$

Exit gas assays via drager tubes indicated 450 ppm v/v $NH_3$.

The drager tube reacts to $NH_3$ and other basic species (amines) in the sample gas, e.g. monochloramine, etc.

(c) (d) Acid Hydrolysis

The solution formed in the first aeration was made acidic to hydrolyze all $CNO^-$ to $NH_{4+}$ followed by caustic addition to raise the pH, converting $NH_{4+}$ to $NH_3$.

$CNO^-$ destruction was very rapid, probably less than 30 minutes.

The acid and caustic requirements for this stage were about 6 kg $H_2SO_4$ $m^{-3}$ for pH 12 to pH 3 and 5 kg NaOH $m^{-3}$ to raise pH from 3 to 12. It was noted that some foaming occurs when pH falls below 7.

(e) Second Aeration

The $NH_3$ in the neutralized solution formed in the acid hydrolysis stage was removed to the atmosphere in a second aeration.

Ammonia removal during this second aeration was 92% at an Air:Liquor Ratio of 4750:1.

The area specific flow rates for this second aeration were:

Liquor = 0.57 1 $m^{-2}sec^{-1}$

Air = 164 $m^3min^{-1}m^{-2}$

The drager tube sampling method was again used on the exit gas giving an indicated 200 ppm v/v $NH_3$ in the exit gas. Calculations based on air and liquor flows and the reduction in the solution $NH_3$ levels predict 170 ppm v/v $NH_3$ in the gas phase. Hence, the drager tubes appear to give realistic figures in this stage, at least.

The conclusion which can be drawn from this example is that chlorination of the $CN^-$ can be achieved by near stoichiometric addition of chlorine. A small excess seems necessary, possibly due to reaction with ammonia at the lower $CN^-$ levels.

Stripping of $NH_3$ from the alkaline solutions is very efficient with good tail solutions being obtained. Chlorinated amines in the exit gas would not appear to be a problem especially with accurate chlorination dosing control. Cyanate conversion is very rapid indeed and thus is not a problem.

While it has been convenient to describe the invention herein in relation to particularly preferred embodiments, it is to be appreciated that other embodiments and arrangements are also considered as falling within the scope of the invention. Various modifications, alterations, variations and/or additions to the embodiments and arrangements described herein are also considered as falling within the scope and ambit of the present invention as defined by the claims.

We claim:

1. A process for reducing the cyanide content of a solution containing both cyanide ions and dissolved ammonia, comprising the following consecutive steps:
    (a) adding a halogenating agent to the solution while maintaining the pH of the solution at greater than 7;
    (b) removing ammonia from the solution by aeration;

(c) acidifying the solution to a pH of less than 7;
(d) substantially neutralizing the solution; and
(e) removing the ammonia from the solution by aeration.

2. A process according to claim 1 wherein the aeration steps comprise air stripping for removal of ammonia from the solution.

3. A process according to claim 1 wherein the halogenation agent is a chlorination agent.

4. A process according to claim 3 wherein the chlorination agent is chlorine gas.

5. A process according to claim 4 wherein the chlorine gas is generated in solution.

6. A process according to claim 1 wherein the pH is maintained at a level of between 11 and 12 during step (a).

7. A process according to claim 1 wherein sodium hydroxide is used to raise pH in step (a) and/or step (d).

8. A process according to claim 1 wherein ammonia removed from the solution is collected in a gas scrubbing system.

* * * * *

UNITED STATES PATENT AND TRADEMARK OFFICE
CERTIFICATE OF CORRECTION

PATENT NO. : 5,120,451
DATED : June 9, 1992
INVENTOR(S) : M.C. Costello et al.

It is certified that error appears in the above-identified patent and that said Letters Patent is hereby corrected as shown below:

Column 1, line 12, "along" should read --a long--.

Column 1, line 41, "cyanide" should read --cyanate--.

Column 1, line 60, "patent application" should read --Patent Application--.

Column 1, line $^{63}$, "of" should read --to--.

Column 1, line 63, "to" should read --of--.

Column 2, line 6, "88/04408" should read --88/08408--.

Column 2, line 53, "his" should read --this--.

Signed and Sealed this

Seventeenth Day of August, 1993

*Attest:*

BRUCE LEHMAN

*Attesting Officer*   Commissioner of Patents and Trademarks